2,889,357

PRODUCTION OF ALPHA-CHLORACRYLIC ACID ESTERS

Herbert Friederich, Worms, and Manfred Minsinger, Ludwigshafen (Rhine), Germany, assignors to Badische Anilin- & Soda-Fabrik Aktiengesellschaft, Ludwigshafen (Rhine), Germany No Drawing. Application November 6, 1956
Serial No. 620,586

Claims priority, application Germany November 9, 1955

7 Claims. (Cl. 260—486)

This invention relates to a process of manufacturing alpha-chloracrylic acid esters.

It is already known to prepare alpha-chloracrylic acid esters by splitting off hydrogen chloride from dichlorpropionic acid esters which have at least one chlorine atom in alpha-position. In the known method, the dichlorpropionic acid esters are prepared in a separate operation, for example alpha,beta-dichlorpropionic acid esters by chlorination of acrylic acid esters, and then reacted to alpha-chloracrylic acid esters in a second operation.

It is an object of this invention to provide a process for the direct synthesis of alpha-chloracrylic acid esters. A more specific object is to provide a method of manufacturing alpha-chloracrylic acid esters by the interaction of acrylic acid esters and chlorine.

These and other objects which will be apparent from the more detailed description of the invention are accomplished in a one working operation by reacting acrylic acid esters and chlorine in the gas phase in the presence of salts of the first sub-group or the second to eighth groups of the periodic system. Surprisingly there are thereby obtained alpha-chloracrylic acid esters in good yields without any appreciable polymerization of the esters formed and without any large formation of more highly chlorinated products, which could form for example by the adding on of chlorine to alpha-chloracrylic acid esters. The alpha,beta-dichlorpropionic acid ester formed besides the alpha-chloracrylic acid esters can also be converted to alpha-chloracrylic acid esters in the known way.

Suitable catalytically-acting metal salts are for example the chlorides, bromides, iodides, silicates, acetates and phosphates of copper, calcium, strontium, barium, zinc, iron, nickel and cobalt. Salts of metals of the first sub-group, the second sub-group and main group and the eighth group of the periodic system of elements are especially preferred. The metal salts can also be formed in the reaction chamber in the presence of the reactants from the salt-forming components, for example a metal oxide and phosphorous pentoxide. The catalysts can be used as such or applied to carrier substances, such as aluminium oxide, silica, silicates, pumice and the like.

Suitable acrylic acid esters are for example the esters of saturated or unsaturated aliphatic, cycloaliphatic or araliphatic alcohols. Of special interest are acrylic acid esters of saturated short-chain aliphatic monoalcohols which contain 1 to 4 C-atoms in the alcohol radical. By adding small amounts of N-substituted acid amides, especially of carboxylic acids with 1 to 2 C-atoms, lactams and/or amines, the conversion can be increased and the formation of residue greatly diminished. Such additional substances are for example N-methylformamide, N,N-dimethylformamide, N-ethylformamide, N,N-diethylformamide, N-butylformamide, N,N-dibutylformamide, N-methylacetamide, pyrrolidone-2, N-methylpyrrolidone-2 and the like, and also primary, secondary or tertiary amines, such as ethylamine, propylamine, normal-butylamine, dimethylamine, diethylamine, dipropylamine, dibutylamine, triethylamine, tributylamine and the like. As a rule from 0.1 to 3% of these additional substances are used with reference to the weight of the acrylic acid ester. Favorable reaction temperatures lie between 150° and 500° C., but preferably between 200° and 300° C.

The chlorine used can be diluted by indifferent gases, as for example nitrogen. The amount of chlorine is preferably chosen so that from 0.9 to 1.8 mols of chlorine are present for each mol of acrylic acid ester. The process is preferably carried out at normal pressure; it may be carried out however at increased or reduced pressure. In order to avoid the polymerization of the acrylic acid esters before they are interacted with chlorine, it is advantageous to add to these esters a small amount of a polymerization inhibitor, for example hydrochinone, phenothiazine, p-phenylene diamine or other well-known polymerization inhibitors.

For carrying out the reaction it is advantageous to use a corrosion-proof reaction vessel, for example a reaction tube of graphite or ceramic material, which is wholly or partly filled with the catalyst. The catalyst may however also be arranged in one or more layers in the reaction vessel. The process can be carried out in cocurrent or countercurrent. It is especially preferable to lead the substances to be reacted over the catalyst in cocurrent. From the reaction mixture leaving the reaction tube, after condensation of the liquid constituents, the alpha-chloracrylic acid esters may be separated in the usual way, for example by distillation.

The following examples will further illustrate this invention but the invention is not restricted to these examples. The parts specified in the examples are parts by weight.

Example 1

Into a vertically-arranged corrosion-proof tube of ceramic material 1.20 metres long and 4 centimetres in diameter there are introduced 400 grams of a catalyst containing 15% of barium chloride, which is applied to aluminium oxide. Through the tube which is heated externally to 240° C. there are led downwardly per hour 100 grams of methyl acrylate stabilized with 0.1% of hydroquinone. At the same time 100 grams of chlorine per hour are supplied to the reaction tube at the top.

The reaction mixture leaving the tube at the bottom is led into a cooler; the fraction thus liquefied is fractionally distilled.

After the throughput of 2000 grams of methyl acrylate, there are obtained, besides 510 grams of unreacted methyl acrylate, 986 grams of alpha-chloracrylic acid methyl ester and 730 grams of methyl alpha,beta-dichlorpropionate. The amount of the higher-boiling fraction amounts to 358 grams.

Example 2

The same reaction tube and the same catalyst are used as in Example 1. Through the tube, heated externally to 240° C., there are led downwardly per hour 100 grams of a vaporous mixture of 2000 grams of methyl acrylate stabilized with 0.1% of hydroquinone and 20 grams of dimethylformamide. At the same time 100 grams of chlorine per hour are supplied to the reaction tube at the top. The reaction mixture leaving the tube at the bottom is led through a cooler and the liquefied fractionally distilled. Besides 285 grams of unreacted methyl acrylate, there are obtained 1395 grams of alpha-chloracrylic acid methyl ester and 866 grams of alpha,beta-dichlorpropionic acid methyl ester. The amount of higher-boiling constituents is 280 grams.

Example 3

100 grams of a vaporous mixture of 2000 grams of methyl acrylate stabilized with 0.1% of hydroquinone and 10 grams of diethylamine are reacted per hour with 100 grams of chlorine in the same reaction tube as in Example 1 and with the same catalyst. The reaction product is worked up as in Example 1. Besides 360 grams of unreacted methyl acrylate there are obtained 1300 grams of methyl alpha-chloracrylate and 854 grams of metayl alpha,beta-dichlorpropionate. The amount of higher-boiling constituents is 290 grams.

Example 4

Under the same conditions as in Example 1, 100 grams per hour of a vaporous mixture of 2000 grams of methyl acrylate stabilized with 0.1% of hydroquinone and 20 grams of normal butylamine are reacted with 100 grams of chlorine. The reaction product is worked up as in Example 1. Besides 310 grams of unreacted methyl acrylate there are obtained 1365 grams of alpha-chloracrylic acid ester and 845 parts of alpha,beta-dichlorpropionic acid methyl ester. The amount of the higher-boiling constituents is 305 grams.

Example 5

Under the same conditions as in Example 1, 100 grams per hour of a vaporous mixture of 2000 grams of methyl acrylate stabilized with 0.1% of hydroquinone and 40 grams of triethylamine are reacted with 100 grams of chlorine. The reaction product is worked up as in Example 1. Besides 385 grams of unreacted methyl acrylate, there are obtained 1295 grams of methyl alpha-chloracrylate and 850 grams of methyl alpha,beta-dichlorpropionate. The amount of higher-boiling constituents is 355 grams.

Example 6

400 grams of a catalyst which contains 10% of cobalt bromide which is applied to aluminium oxide are introduced into a vertically-arranged corrosion-proof tube of ceramic material 120 metres long and 4 centimetres in diameter. Through the tube, heated externally to 250° C., there are led hourly downwardly 100 grams of a vaporous mixture of 2000 grams of methyl acrylate stabilized with 0.1% of hydroquinone and 10 grams of dimethyl formamide. At the same time 100 grams of chlorine per hour are supplied to the reaction tube at the top. The reaction product is worked up as in Example 1. Besides 414 grams of unreacted methyl acrylate there are obtained 1065 grams of methyl alpha-chloracrylate and 1265 grams of alpha,beta-dichlorpropionic acid methyl ester. The amount of higher-boiling constituents is 69 grams.

Example 7

400 grams of a catalyst which contains 10% of zinc chloride which is applied to aluminium oxide are introduced into a vertically-arranged corrosion-proof tube of ceramic material 120 metres long and 4 centimetres in diameter. Through the tube, heated externally to 270° C., 100 grams of a vaporous mixture of 2000 grams of methyl acrylate stabilized with 0.1% of hydroquinone and 30 grams of dimethylformamide are led downwardly each hour. At the same time 100 grams of chlorine are supplied to the top of the reaction tube each hour. The reaction product is worked up as in Example 1. Besides 390 grams of methyl acrylate, there are obtained 1125 grams of methyl alpha-chloracrylate and 1160 grams of methyl alpha,beta-dichlorpropionate. The amount of constituents of higher boiling point is 185 grams.

Example 8

In the same reaction tube as in Example 1 and with the same catalyst, 100 grams of a vaporous mixture of 2000 grams of ethyl acrylate stabilized with 0.1% of hydroquinone and 40 grams of dimethylformamide are reacted with 90 grams of chlorine. The reaction product is worked up as in Example 1. Besides 18 grams of unreacted ethyl acrylate, there are obtained 1305 grams of ethyl alpha-chloracrylate and 1245 grams of ethyl alpha,beta-dichlorpropionate. The amount of higher-boiling constituents is 107 grams.

Example 9

400 grams of a catalyst which contains 5% of copper-II-chloride which is applied to aluminium oxide and extruded in 4 millimetre strings are introduced into a vertically-arranged corrosion-proof tube of ceramic material 120 metres long and 4 centimetres in diameter. Through the tube, heated externally to 280° C., 100 grams per hour of a vaporous mixture of 2000 grams of methyl acrylate stabilized with 0.1% of hydroquinone and 20 grams of N,N-dimethylformamide are led downwardly. At the same time 100 grams per hour of chlorine are supplied to the reaction tube at the top. The reaction product is worked up as in Example 1. Besides 366 grams of unreacted methyl acrylate there are obtained 1121 grams of methyl alpha-chloracrylate and 1226 grams of methyl alpha,beta-dichlorpropionate. The amount of higher-boiling constituents is 183 grams.

We claim:

1. A method of manufacturing alpha-chloracrylic acid esters of lower alkanols which comprises reacting an ester of acrylic acid and a lower alkanol and chlorine in the gas phase in the molar ratio of 0.9 to 1.8 mols of chlorine per mol of the ester at a temperature between 200° and 300° C. in the presence of a catalyst selected from the class consisting of chlorides and bromides of copper, calcium, strontium, barium, zinc, iron, nickel and cobalt.

2. A method of manufacturing alpha-chloracrylic acid esters of lower alkanols which comprises reacting an ester of acrylic acid and a lower alkanol and chlorine in the gas phase in the molar ratio of 0.9 to 1.8 mols of chlorine per mol of the ester at a temperature between 200° and 300° C. in the presence of a barium chloride catalyst.

3. A method of manufacturing alpha-chloracrylic acid esters of lower alkanols which comprises reacting an ester of acrylic acid and a lower alkanol and chlorine in the gas phase in the molar ratio of 0.9 to 1.8 mols of chlorine per mol of the ester at a temperature between 200° and 300° C. in the presence of a cobalt bromide catalyst.

4. A method of manufacturing alpha-chloracrylic acid esters of lower alkanols which comprises reacting an ester of acrylic acid and a lower alkanol and chlorine in the gas phase in the molar ratio of 0.9 to 1.8 mols of chlorine per mol of the ester at a temperature between 200° and 300° C. in the presence of a zinc chloride catalyst.

5. A method of manufacturing alpha-chloracrylic acid esters of lower alkanols which comprises reacting an ester of acrylic acid and a lower alkanol and chlorine in the gas phase in the molar ratio of 0.9 to 1.8 mols of chlorine per mol of the ester at a temperature between 200° and 300° C. in the presence of a cupric chloride catalyst.

6. A method as claimed in claim 1 wherein the reaction is carried out in the presence of a small amount of an N-substituted acid amide selected from the class consisting of N-methylformamide, N,N-dimethylformamide, N-ethylformamide, N,N-diethylformamide, N-butylformamide, N,N-dibutylformamide, N-methylacetamide, pyrolidone-2, and N-methylpyrrolidone-2.

7. A method as claimed in claim 1 wherein the reaction is carried out in the presence of a small amount of an amine selected from the class consisting of primary, secondary and tertiary aliphatic amines containing alkyl radicals with from 1 to 4 carbon atoms.

References Cited in the file of this patent
UNITED STATES PATENTS

| | | |
|---|---|---|
| 2,087,466 | Bauer et al. | July 20, 1937 |
| 2,245,547 | Pollack | June 10, 1941 |
| 2,647,923 | Burton | Aug. 4, 1953 |
| 2,680,764 | Ney | June 8, 1954 |
| 2,769,835 | Kosmin et al. | Nov. 6, 1956 |